United States Patent Office 3,442,752
Patented May 6, 1969

3,442,752
ADHESIVELY BONDED METAL SURFACES AND METHOD OF MAKING SAME
Stanley Robert Sandler, Springfield, Florence Ray Berg, Philadelphia, and George Kitazawa, Yardley, Pa., assignors to The Borden Company, New York, N.Y., a corporation of New Jersey
No Drawing. Filed Aug. 18, 1965, Ser. No. 480,805
Int. Cl. B32b 15/20, 15/08, 27/38
U.S. Cl. 161—186          8 Claims

ABSTRACT OF THE DISCLOSURE

This invention relates to the method of making adhesively bonded surfaces, at least two of which are a metal, comprising applying to at least one of said surfaces an adhesive comprising a completely esterified polycarboxylic aromatic acid reacted with epoxide alcohol and curing agent selected from the group consisting of amines, amides, acids, acid anhydrides and mixtures thereof, contacting said adhesive applied surface with another surface and curing said contacted surfaces with said adhesive therebetween at a temperature of at least about 75° C. The invention also relates to the novel adhesive used in the method. More particularly, the invention relates to adhesives containing epoxy esters of polycarboxylic aromatic acids which when cured display high tensile shear strengths in cryogenic temperature ranges and in elevated temperature ranges. The high tensile shear strength is particularly apparent when the composition is used to adhesively bond metal surfaces and will be described in connection therewith.

Polyurethane adhesives are known to exhibit relatively high tensile shear strength in cryogenic temperature ranges. However, these adhesives fail at elevated temperatures. Adhesives having high tensile shear strength at extreme temperatures are needed in the field of space exploration for adhesion of components which are expected to be exposed to these extremes in temperature.

The present invention provides adhesively bonded surfaces which offer exceptionally high tensile shear strength in cryogenic temperature ranges and in elevated temperature ranges and the method for making said adhesively bonded surfaces.

Briefly stated, the present invention comprises surfaces adhesively bonded with an adhesive containing completely esterified epoxy esters of polycarboxylic aromatic acids and amine curing agents and the method for making said surfaces. The adhesive is cured at preferably elevated temperatures. The resulting adhesive bond between the adhered aluminum surfaces is as high as 3,390 p.s.i. when tested at temperatures of 250° F., 1,700 p.s.i. at 400° F., 2,700–5,037 p.s.i. at −320° F. and 2,920 p.s.i. at −453° F.

We have found that the adhesive is particularly well suited for bonding metal surfaces which are exposed to these temperature extremes. Metals which can be advantage be adhesively bonded to like or other metals with the adhesive described, include aluminum, stainless steel, other iron containing alloys, and other metals such as magnesium and titanium and their alloys.

The invention will be further described in connection with adhesive bonds formed between metal surfaces by the herein described adhesive composition and the tensile shear strength measured for said bonds at cryogenic and elevated temperatures.

As to materials, the polycarboxylic aromatic acid is preferably a mononuclear aromatic acid having between 2–4 carboxylic substitutent groups on the aromatic moiety. Examples of these acids include the 1,2-, 1,3- and 1,4-isomers of phthalic acid; trimesic, hemimellitic and trimellitic acid; and prehnitic, mellophanic and pyromellitic acid.

The epoxy component is an expodized alcohol which, when reacted with said acid or halide thereof, results in the ester component of the adhesive. The epoxy alcohol comprises those monohydric alcohols having at least one epoxy group, i.e., a

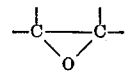

group. The epoxidized alcohols may be aliphatic, cycloaliphatic, aromatic or heterocyclic and may be saturated or unsaturated and substituted with non-interfering substitutents such as halogen atoms and contains between 3–15 carbon atoms. These epoxy alcohols include epoxyalkanols, epoxyalkoxyalkanols, epoxyalkenols, epoxyalkoxyalkenols, and cyclo derivatives thereof. Examples include: 2,3-epoxypropanol (glycidol), 3,4-epoxybutanol, 2,3-epoxyhexanol, 2,3-epoxydodecanol, 3,4-epoxydodecanol, epoxidized octadecadienol, 3,4-epoxydihydropyran-5-propanol, 2,3-dimethyl-4,5-epoxyoctanol, 2,3-epoxy-5-octanol, 2,3-epoxy-6-dodecanol, 2-methoxy-4,5-epoxyoctanol, 2,3-epoxypropoxypropanol, 2,3-epoxypropoxyhexanol, 2,3-epoxypropoxy - 2,3-dihydroxyheptanol, 4-chloro-5,6-epoxydodecanol, 3,4-epoxy-5-chlorocyclohexanol, 2,3-epoxycyclohexanol, 2,3-epoxypropoxy-5-octenol, 2,3-epoxypropoxy-4-cyclohexanol, and the like.

Particularly preferred are the monoepoxy substituted alkanols containing between 3–8 carbon atoms and having the epoxy group in the terminal position. Within this group, 2,3-epoxypropanol is preferred.

As to the hardening agent, amines are preferred and best suited. In combination with the amines, acids or anhydrides thereof can be used. The amine may be primary, secondary or tertiary and an amine structure may be repeated within the curing agents as is the case with polyamines. The amines may also contain amide groups therein, as for example Versamids (which are believed to be polyamides with free amino groups therein). Examples of the useful amines, and amines in combination with acids and anhydrides include: methylene dianiline, tetraamino biphenyl, p-chloroaniline, N,N'-(2-aminoethyl) oxydibenzylamine, N,N,N',N' - tetraethyl oxydibenzylamine, 4,4'-diaminooctafluorobiphenyl, phthalic anhydride and benzyldimethylamine, trimellitic anhydride and benzyldimethylamine, promellitic dianhydride and benzyldimethylamine, cyclopentanetetracarboxylic acid dianhydride and benzyldimethylamine, and the like.

The ester is prepared as by converting the acid to the acid halide, and by further reaction of the halide with the particular epoxy-alcohol under reduced temperatures. Lower temperature esterification permits control of the reaction. The esterification reaction may be carried out in a solvent for the reactants which may also be a solvent for the products of reaction. Also included may be an acceptor of the halogen acid with is formed during the esterification reaction when acid halides are used.

When used, the proportions of solvent is generally in the range of up to about 3 liters for each gram-mole of acid used. The proportion can, of course, he varied as desired. The solvent includes aromatic hydrocarbons such as benzene, toluene, and xylene; and ketones such as acetone and methylethylketone.

The acid acceptor is used in proportion approximately equal to its acid acceptance capacity as for example about 3 moles triethylamine would be required for each mole of triester formed, whereas only 2 moles of trimethylamine would be required for each mole of di-ester formed.

The halogen acid acceptor may be an amine and preferably a tertiary amine or an inorganic base, examples of which include sodium carbonate and sodium bicarbonate.

The adhesive is prepared by combining the ester and curing agent in the proportion of between .1–1.0 amino or amido groups of the curing agent for each epoxy group in the ester molecule. For example, a tri-epoxy ester requires between .3–3.0 amino or amido groups, or in terms of a specific curing agent like methylenedianiline, .15–1.5 moles for each mole of tri-epoxy ester.

The adhesive was tested for tensile shear strength when used to adhesively bond metal-metal surfaces. The metal was pre-etched in acid-oxidizing solutions, i.e., stainless steel for example, in nitric acid and sulfuric-hydrochloric-hyrdofluoric acid; aluminum, in sulfuric acid-potassium dichromate solution. The cleaned metal surface was coated with the adhesive, contacted with another surface of cleaned metal, and cured at elevated temperatures, as for example above 75° C., for several hours until cured. Optionally, both surfaces could be coated with adhesive. After curing, the samples were equilibrated in a constant temperature-humidity room; generally at room temperature and about 50% relative humidity for several days. Tensile shear strengths were determined using a Tinius Olsen Electomatic Universal Testing Machine. A cryostat was used for liquid nitrogen and helium testing. The tests at elevated temperatures were conducted in constant temperature forced air oven.

In the examples that follow and elsewhere herein, proportions are expressed as parts by weight unless specifically stated to the contrary.

EXAMPLE 1

(Preparation of triepoxy ester of trimesic acid)

(a) Tri-acid chloride.—To 1 mole of trimesic acid and 4 ml. of pyridine in a reflux kettle was added 5.6 moles of thinoyl chloride. The reaction mixture was heated to reflux temperature and maintained at reflux for about 20 hours. Excess thionyl chloride was removed by distillation and the product was recovered by fractional distillation (2.5–4.0 mm. Hg, 150°–159° C.).

(b) Triepoxy ester.—To a pre-cooled (about 0° C.) mixture of 1.5 moles of glycidol is added simultaneously and separately under agitation, 1.5 moles of triethylamine and a benzene solution of .5 mole of trimesoyl chloride. The temperature was kept below 5° C. After said addition, the temperature was allowed to rise to room temperature. The solids were filtered out and the filtrate concentrated by evaporation of the solvent to give the product. The product was recrystallized from 1:1 petroleum ether and benzene to give white crystals, M.P. 58–63° C.

EXAMPLE 2

The procedure of Example 1(a) is repeated except that the trimesic acid is replaced separately and in turn by the polycarboxylic aromatic acids disclosed herein. The proportion of thionyl chloride is about 1–4 moles for each mole of carboxy radical in the polycarboxylic acid.

In a modification of this example, the procedure of Example 1(b) is repeated except that the glycidol is replaced separately and in turn by the epoxidized alcohols disclosed herein. The proportion of the alcohol is about 1 mole for each mole of acid chloride radical in the acid chloride.

EXAMPLE 3

(Preparation of the adhesive)

The liquified esters of Examples 1 and 2 are mixed with liquified methylendianiline in proportion of 2-$NH_2$ groups of curing agent per 4 epoxy groups of ester.

EXAMPLE 4

In a modification of Example 3, methylenedianiline is replaced separately and in turn by the curing agent disclosed herein in the range of proportions of between .25–1.0 amino or amido groups for each epoxy group in the molecule.

EXAMPLE 5

The adhesives prepared as in Examples 3 and 4 are coated onto cleaned aluminum and stainless steel surfaces to give an adhesive layer of about 1–5 mils. The adhesive surface is covered by the same or other metal and cured at about 100° C. for 2 hours. The adhered metals are then equilibrated at about 23° C. and 50% relative humidity for about 7 days. Tensile shear strength tests were then run on samples so prepared. The following table shows the superior results obtained by the adhesives of this invention in the extreme temperature ranges of −453° F. to −320° F. (cryogenic range) and 250° F. to 400° F. (elevated range). Bisphenol A is included by way of comparison with other epoxy products; it forms no part of this invention.

TABLE I.—TENSILE SHEAR STRENGTH, P.S.I., ON ALUMINUM-ALUMINUM SURFACES

|  | −453° F. | −320° F. | 73° F. | 250° F. | 400° F |
|---|---|---|---|---|---|
| Tris(2,3-epoxypropyl) trimesoate, MdiA[1](3/.6)[2] | 2,920 | 2,700 | 2,700 | 2,410 | 1,700 |
| Di(2,3-epoxypropyl) phthalate, MdiA (2.5/0.9) |  | 5,037 | 4,057 | 1,200 |  |
| Bisphenol A diglycidyl ether, MdiA (5/1.4) |  | 2,130 | 1,690 | 1,240 | 556 |
| Tetraglycidyl pyromellitate, MdiA (2.4/1) |  | 1,800 | 2,200 | 2,960 | 1,098 |
| Diglycidyl isophthalate, MdiA (2.8/1.0) |  | 4,200 | 3,780 | 2,660 | 385 |
| Di(2,3-epoxypropyl) terephthalate, MdiA (2.1/0.5) | 2,270 | 3,350 | 2,740 | 2,220 | 428 |
| Di-(2,3-epoxypropyl) terephthalate, CPDA,[3] BDA[4] (1.7/1.0/0.03 ml.) |  | 1,746 | 3,150 | 3,390 | 1,535 |
| Di(2,3-epoxypropyl) isophthalate, CPDA, BDA (2.8/2.1/0.06 ml.) |  | 1,650 | 1,560 | 1,730 | 1,210 |

[1] MdiA is methylenedianiline.
[2] Molar ratio of epoxy to curing agent.
[3] Cyclopentane tetracarboxylic acid dianhydride.
[4] Benzyldimethylamine.

It will be understood that it is intended to cover all changes and modifications of the examples of the invention herein chosen for the purpose of illustration which do not constitute departures from the spirit and scope of the invention.

We claim:

1. The method of making adhesively bonded surfaces, at least one of which is metal, and the adhesive bond having a tensile shear strength in the cryogenic temperature range of −453° F. to −320° F. of at least about 1650 p.s.i. and in the elevated temperature range of 250° F. to 400° F. of at least about 1200 p.s.i., comprising the steps of:

(1) applying to at least one of said surfaces an adhesive comprising:

(a) a completely esterified reaction product of a polycarboxylic aromatic acid and an epoxidized monohydric alcohol having at least one epoxy group, and (b) a curing agent for said ester in an amount sufficient to cure the epoxy groups in said ester selected from the group consisting of amines, mixtures of amines, amides and organic acids; mixtures of amines, amides and organic acid anhydrides; mixtures of amines and organic acids; and mixtures of amines and organic acid anhydrides, (2) contacting said adhesive applied surface with another surface, and (3) curing said contacted surfaces with said adhesive therebetween at a temperature of at least about 75° C., said curing agent being present in the proportion of between about 0.1 to about 1 amino or amido group of the curing agent for each epoxy group of said esterified reaction product.

2. The method of claim 1 wherein:

(1) said metal surface is selected from the group consisting of aluminum, stainless steel, iron containing alloys, magnesium and titanium, (2) said aromatic acid is a mononuclear aromatic acid and having between 2–4 carboxylic substituent groups of said aromatic moiety, and (3) said alcohol is monohydric, contains between 3–15 carbon atoms, and has at least one epoxy group of the general structure:

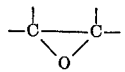

3. The method of claim 2 wherein:

(1) said metal surface is aluminum, (2) said aromatic acid is selected from the group consisting of
   (a) 1,2-, 1,3- and 1,4-isomers of phthalic acid;
   (b) trimesic, hemimellitic and trimellitic acid; and
   (c) prehnitic, mellophanic and pyromellitic acid, and (3) said alcohol is selected from the group consisting of
   (a) epoxyalkanols,
   (b) epoxyalkoxyalkanols,
   (c) epoxyalkenols,
   (d) epoxyalkoxyalkenols, and
   (e) cyclo derivatives of epoxyalkanols, epoxyalkoxyalkanols, epoxyalkenols, and epoxyalkoxyalkenols.

4. The method of claim 3 wherein:

(1) said aromatic acid is trimesic acid, (2) said alcohol is 2,3-epoxypropanol, (3) said curing agent is methylenedianiline, and (4) the proportion of said completely esterified trimesic acid and said methylenedianiline curing agent being in the range of .15–1.5 moles of said methylenedianiline for 1 mole of said completely esterified trimesic acid.

5. Adhesively bonded surfaces, at least one of which is metal, and the adhesive bond when cured having a tensile shear strength in the cryogenic temperature range of —453° F. to —320° F. of at least about 1650 p.s.i. and in the elevated temperature range of 250° F. to 400° F. of at least about 1200 p.s.i. comprising an adhesive disposed between said surfaces, said adhesive comprising:

(1) a completely esterified reaction product of a polycarboxylic aromatic acid and an epoxidized monohydric alcohol having at least one epoxy group; and (2) a curing agent selected from the group consisting of amines, mixtures of amines, amides and organic acids; mixtures of amines, amides and organic anhydrides; mixtures of amines and organic acids; and mixtures of amines and organic acid anhydrides; said curing agent being present in the proportion of between about 0.1 to about 1 amino or amido group of the curing agent for each epoxy group of said esterified reaction product.

6. Adhesively bonded surfaces as in claim 5, wherein:

(1) said metal surface is selected from the group consisting of aluminum, stainless steel, iron containing alloys, magnesium and titanium, (2) said aromatic acid is a mononuclear aromatic acid and having between 2–4 carboxylic substituent groups of said aromatic moiety, and (3) said alcohol is monohydric, contains between 3–15 carbon atoms, and has at least one epoxy group of the general structure:

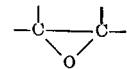

7. Adhesively bonded surfaces as in claim 6, wherein:

(1) said metal surface is aluminum, (2) said aromatic acid is selected from the group consisting of
   (a) 1,2-, 1,3- and 1,4-isomers of phthalic acid;
   (b) trimesic, hemimellitic and trimellitic acid; and
   (c) prehnitic, mellophanic and pyromellitic acid, and (3) said alcohol is selected from the group consisting of
   (a) epoxyalkanols,
   (b) epoxyalkoxyalkanols,
   (c) epoxyalkenols,
   (d) epoxyalkoxyalkenols, and
   (e) cyclo derivatives of epoxyalkanols, epoxyalkoxyalkanols, epoxyalkenols, and epoxyalkoxyalkenols.

8. Adhesively bonded surfaces as in claim 7, wherein:

(1) said aromatic acid is trimesic acid, (2) said alcohol is 2,3-epoxypropanol, (3) said curing agent is methylenedianiline, and (4) the proportion of said completed esterified trimesic acid and said methylenedianiline curing agent being in the range of .15–1.5 moles of said methylenedianiline for 1 mole of said completely esterified trimesic acid.

References Cited

UNITED STATES PATENTS

| | | | |
|---|---|---|---|
| 2,691,004 | 10/1954 | Doyle | 161—186 X |
| 2,833,681 | 5/1958 | Nelson et al. | 156—330 X |
| 2,920,990 | 1/1960 | Been et al. | 156—330 X |
| 2,951,778 | 9/1960 | Haberlin | 156—330 X |
| 3,042,545 | 7/1962 | Kienle et al. | 117—75 |
| 3,062,840 | 11/1962 | Schwarzer | 156—330 X |
| 3,238,087 | 3/1966 | Norwalk et al. | 161—186 X |
| 3,296,332 | 1/1967 | Chase et al. | 156—330 X |

HAROLD ANSHER, *Primary Examiner.*

U.S. Cl. X.R.

156—330, 332; 161—214